United States Patent
Dickess et al.

(10) Patent No.: US 11,332,668 B2
(45) Date of Patent: May 17, 2022

(54) TREATED MEDIUM FOR PLANT GROWTH THAT HAS INCREASED WATER RETENTION

(71) Applicant: BASF SE, Ludwigshafen am Rhein (DE)

(72) Inventors: Shawn Dickess, Cincinnati, OH (US); Dean A Oester, Cincinnati, OH (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/647,991

(22) PCT Filed: Sep. 14, 2018

(86) PCT No.: PCT/EP2018/074837
§ 371 (c)(1),
(2) Date: Mar. 17, 2020

(87) PCT Pub. No.: WO2019/057617
PCT Pub. Date: Mar. 28, 2019

(65) Prior Publication Data
US 2020/0255735 A1    Aug. 13, 2020

Related U.S. Application Data

(60) Provisional application No. 62/560,850, filed on Sep. 20, 2017.

(51) Int. Cl.
*C09K 17/32* (2006.01)
(52) U.S. Cl.
CPC .................... *C09K 17/32* (2013.01)
(58) Field of Classification Search
CPC ........ C09K 17/00; C09K 17/14; C09K 17/18; C09K 17/32; A01N 25/02; A01N 25/04; A01N 25/14; A01N 25/30; A01G 24/00; A01G 24/28; A01G 24/30; A01G 24/35; E02D 3/00; E02D 3/12; C05G 3/50; C05G 3/70; C05F 11/04
USPC ............. 252/194; 405/263, 264; 47/DIG. 10, 47/48.1 SC
See application file for complete search history.

(56) References Cited

U.S. PATENT DOCUMENTS

| | | | |
|---|---|---|---|
| 3,458,953 A | 8/1969 | Moses et al. | |
| 3,673,087 A * | 6/1972 | Brian | A01N 25/30 252/194 |
| 5,867,937 A * | 2/1999 | Templeton | A01G 24/00 252/183.13 |
| 6,481,153 B1 * | 11/2002 | Petrea | C09K 17/16 47/1.01 R |
| 7,021,864 B2 * | 4/2006 | Maile | C09K 17/40 405/264 |
| 7,399,730 B2 * | 7/2008 | Kostka | A01N 25/30 504/362 |
| 8,129,312 B2 * | 3/2012 | Berghaus | A01N 25/30 504/116.1 |
| 8,912,122 B1 * | 12/2014 | Blackstone | C05G 3/60 504/100 |
| 9,038,311 B2 | 5/2015 | Chen et al. | |
| 9,487,698 B2 * | 11/2016 | Palmer, Jr | C09K 17/18 |
| 2010/0184603 A1 * | 7/2010 | Stoesser | A01N 25/30 504/362 |
| 2011/0175026 A1 | 7/2011 | Bially | |
| 2014/0270984 A1 * | 9/2014 | Erickson | C09K 17/18 252/194 |

FOREIGN PATENT DOCUMENTS

| | | | |
|---|---|---|---|
| JP | 06030654 A | * | 2/1994 |
| JP | H0630654 A | | 2/1994 |
| WO | 03031536 A1 | | 4/2003 |
| WO | 2013110552 A1 | | 8/2013 |
| WO | 2014043443 A1 | | 3/2014 |

OTHER PUBLICATIONS

International Search Report for International Application No. PCT/EP2018/074837, dated Nov. 13, 2018, 4 pages.
Written Opinion of the International Searching Authority for International Application No. PCT/EP2018/074837, dated Nov. 13, 2018, 8 pages.
Karagunduz, A. et al., Influence of a Non-ionic surfactant on the water retention properties of unsaturated soils, Soil Science Society of America Journal, Sep. 2001, vol. 65, No. 5, p. 1392-1399. Abstract.

* cited by examiner

*Primary Examiner* — Matthew R Diaz
(74) *Attorney, Agent, or Firm* — Armstrong Teasdale LLP

(57) ABSTRACT

A treated medium for plant growth includes (A) a medium for plant growth and (B) a water retaining composition disposed on the medium. The composition also includes (1) an alcohol alkoxylate, (2) water, (3) a surfactant, and (4) a humectant. The (1) alcohol alkoxylate has the structure:

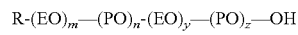

$$R\text{-}(EO)_m\text{-}(PO)_n\text{-}(EO)_y\text{-}(PO)_z\text{-}OH$$

in which R is a $C_3$-$C_{14}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1. The (3) surfactant and (4) humectant are chosen from specific compounds. The treated medium has a water retention of from 100 to 400 grams of water per 100 grams of treated medium as compared to a control medium that is free of the water retaining composition.

21 Claims, No Drawings

TREATED MEDIUM FOR PLANT GROWTH THAT HAS INCREASED WATER RETENTION

CROSS-REFERENCE TO RELATED APPLICATIONS

This application is a U.S. National Phase Application of PCT/EP2018/074837, filed Sep. 14, 2018, which claims the benefit of priority to U.S. Provisional Application No. 62/560,850, filed Sep. 20, 2017, the contents of which are hereby expressly incorporated by reference in their entirety.

FIELD OF THE DISCLOSURE

This disclosure generally relates to a treated medium for plant growth. More specifically, this disclosure relates to a treated medium that has increased water retention and includes a water retaining composition that includes an alcohol alkoxylate, water, a specific surfactant, and a specific humectant.

BACKGROUND

The hydrophobicity of various media for plant growth has long been recognized as an impediment for the efficient wetting of the medium and retention of water in the medium. The slow wetting and retention of water results in the inefficient use of water which can result in water running off the target area into ditches, streams, lakes and/or municipal water treatment systems. The slow wetting of a medium for plant growth and poor retention can result in over-watering to compensate for the slow retention, which is a waste of a valuable and in some regions, a scarce natural resource.

Surfactants are used commonly as wetting agents in the peat moss industry Moses et. al. (U.S. Pat. No. 3,458,953) describes the addition of an alcohol ethoxylate, more specifically ethoxylates of trimethyl heptanol, to water to improve the wetting and retention of water when applied to a soil. This method results in the improved retention of water in the soil from 54% water retention, to between 65 and 81% water retention, an increase of between 20% to 50% above the control water without the described alcohol ethoxylate. Templeton (U.S. Pat. No. 5,867,937) describes the use of EO-PO polymers and silica to relieve hydrophobicity of peat moss, bark, and rockwool in soilless mixes used for plant growth, promoting easier, faster, and more even watering of such mixes without plant injury. The use of EO-PO polymers and alcohol alkoxylates were applied to composted bark at from 250 to 1000 ppm (0.025% to 0.10%). A 200 cc sample of the treated bark was then treated with 200 ml of water and the amount of water retained on the bark was determined to be between 65 ml to 105 ml of water retained on 200 cc of bark, or between 0.325 ml water to 0.525 ml water retained per cc of treated bark. Other art describes water swellable peat pellets including peat moss, a pH adjusting agent, a wetting agent, and an optional processing additive with a preferred bulk density of about 300 to about 600 kg/m³ wherein the wetting agent can be nonionic surfactants such as copolymerized alkane oxides. Still other art (U.S. Pat. No. 9,038,311 B2) describes a peat moss composition that has improved water holding capacity, hydrophilicity, and/or anti-leaching properties comprising one or more polysaccharides, for example guars and/or guar derivatives. A peat treated with a combination of an alcohol ethoxylate and guar, a polysaccharide, increased the water holding capacity (water retention) of peat to 1.10 g water/g peat. However, these references are directed to wetting through consistent application of chemicals and do not have a residual, persistent effect after the first wetting.

Therefore, it is an object of the present invention to provide a simple, efficacious, and cost-effective water retaining composition which improves the ability of the medium to absorb and retain water in the initial wetting as well as subsequent rewettings and reduces losses due to runoff water.

SUMMARY OF THE DISCLOSURE

This disclosure provides a treated medium for plant growth that has increased water retention. The treated medium includes (A) a medium for plant growth and (B) a water retaining composition disposed on the medium. The water retaining composition itself consists essentially of (1) an alcohol alkoxylate, (2) water, (3) a surfactant, and (4) a humectant. The (1) alcohol alkoxylate has the structure:

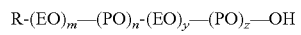

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1. The (3) surfactant is chosen from sulfosuccinates, alkyl sulfosuccinates, alcohol ethoxylates different from (1), copolymers of ethylene oxide and propylene oxide, alkylpolyglycosides and combinations thereof. The (4) humectant is chosen from propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin and triacetin, and combinations thereof. Moreover, the treated medium has a water retention of from 100 grams of water per 100 grams of treated medium to 400 grams of water per 100 grams of treated medium.

In one aspect, the present invention relates to a treated medium for plant growth comprising:
A. a medium for plant growth; and
B. a water retaining composition disposed on the medium
(A) comprising of;
(1) an alcohol alkoxylate having the structure:

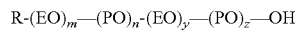

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1,
(2) water,
(3) a surfactant selected from sulfosuccinates, alkyl sulfosuccinates, alcohol ethoxylates different from the alcohol alkoxylate (1), copolymers of ethylene oxide and propylene oxide, alkylpolyglycosides and combinations thereof, and
(4) a humectant selected from propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin and triacetin, and combinations thereof.

In another aspect, the present invention relates to a treated medium for plant growth consisting of:
A. a medium for plant growth; and
B. a water retaining composition disposed on said medium consisting of;
(1) an alcohol alkoxylate having the structure:

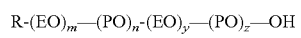

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1, (2) water, (3) a surfactant chosen from sulfosuccinates, alkyl sulfosuccinates, alcohol ethoxylates different from said (1), copolymers of ethylene oxide and propylene oxide, alkylpolyglycosides and combinations thereof, and (4) a humectant chosen from propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin and triacetin, and combinations thereof.

DETAILED DESCRIPTION OF THE DISCLOSURE

This disclosure provides a treated medium for plant growth that has increased water retention. The treated medium includes, or consists essentially of, of a medium for plant growth (e.g. a growth medium) and a water retaining composition disposed on the medium. Alternatively, the treated medium may be or consist of the medium and the water retaining composition disposed on the medium. The medium is "treated" in that it includes the water retaining composition disposed thereon. In other words, the medium is treated with the water retaining composition. The terminology "consists essentially of" describes various embodiments wherein the treated medium may be free of one or more components or chemistries that are not the medium or the composition. Non-limiting examples of such components or chemistries include one or more proteins, polysaccharides, guars, surfactants other than those described below as part of the composition, humectants other than those described below as part of the composition, additives other than those described below as part of the composition, solvents other than water, ethoxylated alcohols that are free of propoxylation, alkylphenol alkoxylates, and/or combinations thereof, and the like. The terminology "free of" describes amounts of one or more of the aforementioned excluded compounds of less than 5, 4, 3, 2, 1, 0.5, 0.1, 0.05, 0.01, 0.005, or 0.001, weight percent based on a total weight percent of the treated medium. Alternatively, the terminology "free of" may describe that an amount of one or more of the aforementioned excluded compounds is less than 0.001 weight percent, undetectable, or zero, weight percent.

The treated medium has a water retention of from 100 to 400, 125 to 375, 150 to 350, 175 to 325, 200 to 300, 225 to 275, 225 to 250, or 250 to 275, 275 to 300, 300 to 325 grams of water per 100 grams of the treated medium as compared to a control medium that is free of the water retaining composition. The 'control medium' is defined as a medium to which the water retaining composition (B) is not added. These results are evident in the initial wetting as well as subsequent rewettings even without the presence of added alcohol alkoxylates in subsequent washes. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

The treated medium is useful in both commercial and residential applications. In various embodiments, the treated medium is used to reduce runoff and/or to improve the ability of the medium to absorb and retain water. For example, when the treated medium is further defined as treated peat (or peat moss), the composition helps the fairly hydrophobic peat absorb water. This can improve growing conditions.

Medium (A):

The medium may be any known in the art for plant growth. The medium may be further defined as peat (also known as peat moss), dirt, soil, etc. The term "peat moss" refers generally to large absorbent moss (genus *Sphagnum*, family Sphagnaceae) that grows in dense masses on boggy ground, where the lower parts decay slowly to form peat deposits. Peat moss is widely used in horticulture, especially for packing plants and for compost. Natural peat moss includes nutrients which are beneficial to plant growth and preservation but is well known to be hydrophobic and difficult to wet when it is dry. Alternatively, the medium may include or be described as coconut coir (which includes dried fibers from plant material), vermiculite, and/or perlite.

The medium may be described as a soil which may be a coarse-grained soil (e.g. sands and gravels), a fine-grained soil (e.g. silts and clays), and/or a highly organic soil. The soil may have varying amounts of sand, gravel, silt and clay, and may have high or low plasticity, as is understood in the soil art. The soil may include minerals, gas, loam, clay, silt, sand, organic peat, organic matter, humus and mixtures thereof. The medium may include potting soil. 'Potting soil' is defined as a soil added to the pots, which may be a coarse-grained soil (e.g. sands and gravels), a fine-grained soil (e.g. silts and clays), a highly organic soil. The potting soil may have varying amounts of sand, gravel, silt and clay, and may have high or low plasticity, as is understood in the soil art. The potting soil may include minerals, gas, loam, clay, silt, sand, organic peat, organic matter, humus and mixtures thereof.

Water Retaining Composition (B):

Referring back to the water retaining composition, the composition may be disposed on the medium in any amount. In various embodiments, the composition is disposed on the medium in an amount of from 0.02 to 0.5, from 0.03 to 0.35, or from 0.04 to 0.30 parts by weight of the composition per 100 parts by weight of the medium. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

The composition itself includes or consists essentially of (1) an alcohol alkoxylate, (2) water, (3) a surfactant, and (4) a humectant. Alternatively, the composition may be or consist of (1)-(4) described above. The terminology "consists essentially of" describes various embodiments wherein the composition is free of one or more components or chemistries that are not any one of (1)-(4) above. Non-limiting examples of such components and chemistries include one or more proteins, polysaccharides, guars, surfactants other than those described as (3), humectants other than those described as (4), additives other than those described below, solvents other than water, ethoxylated alcohols that are free of propoxylation, alkylphenol alkoxylates, combinations thereof, and the like. The terminology "free of" may describe amounts of one or more of the aforementioned excluded compounds of less than 5, 4, 3, 2, 1, 0.5, 0.1, 0.05, 0.01, 0.005, or 0.001, weight percent based on a total weight percent of the composition. Alternatively, the terminology "free of" may describe that an amount of one or more of the aforementioned excluded compounds is less than 0.001 weight percent, undetectable, or zero, weight percent. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.
(1) Alcohol Alkoxylate:

The (1) alcohol alkoxylate is thought to improve the water retention of the medium by increasing adherence of surfactant to the medium and/or allowing the surfactant to remain for a longer period of time on the medium. The alcohol alkoxylate has the structure:

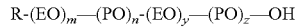

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1. The numerical value of m, n, y and z are the average number of EO or PO monomers added. It is well understood in the art of alkoxylation that the additional of EO or PO results is a distribution of oligomers, centered around an average. In various embodiments, R has 3, 4, 5, 6, 7, 8, 9, 10, 11, 12, 13, 14, 15, 16 or 17 carbon atoms in the linear aliphatic carbon chain or in the branched aliphatic carbon chain. In other embodiments, R has 3 to 10, 3 to 8, 3 to 6, 8 to 17, 8 to 15, 8 to 12, 8 to 10, 10 to 17, 10 to 15, 10 to 13, 12 to 17 or 12 to 15, carbon atoms in the linear aliphatic carbon chain or in the branched aliphatic carbon chain. Moreover, all isomers of the aforementioned compounds are hereby expressly contemplated for use herein. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

In other embodiments, m is any number between and including 0 and 20 or any number described for y below. For example, m may be from 1 to 20, 2 to 18, 4 to 16, 6 to 14, 8 to 12, 10 to 12, 2 to 6, 1, 2, 3, 4, 5, or 6. In other embodiments, y may be the same as m or may be different. Like m, y may be any number between and including 0 and 20 and may be chosen independently from m. In various embodiments, y is 2 to 14, 4 to 12, 6 to 10, or 6 to 8. The sum of (m+y) is at least 1 (i.e., 1 or greater) such that the alkoxylated alcohol has at least some degree of ethoxylation. In an embodiment, the sum of m and y (m+y) is in the range of 1 to 30. In a preferred embodiment, the sum of m and y (m+y) is in the range of 1 to 20. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

In further embodiments, n is from 1 to 40 and may be any number between and including 1 and 40, such that the alkoxylated alcohol has at least some degree of propoxylation. In various embodiments, n may be any number described above relative to m or y. Alternatively, n may be 5 to 40, 10 to 35, 15 to 30, 20 to 25, 1, 2, 3, 4, 5, etc. In even further embodiments, z is 0 to 40 and may be any number between and including 0 and 40. For example, z may be any number described above relative to m, n, or y. In various embodiments, z is 5 to 40, 10 to 35, 15 to 30, 20 to 25, 1, 2, 3, 4, 5, etc. In one embodiment, m is 0, n is 3, y is 14 and z is 17. In another embodiment, m is 6, n is 5, y is 3, and z is 0. In a further embodiment, m is 12, n is 35, y is 0 and z is 0. In still another embodiment, m is 5, n is 2, y is 0 and z is 0. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%. The alcohol alkoxylate may be present in the composition in any amount. In various embodiments, the alcohol alkoxylate is present in an amount of from 20 to 35, from 20 to 30, from 20 to 25, from 25 to 35, or from 25 to 30, weight percent based on a total weight of the composition. In one embodiment, the alcohol alkoxylate is present in an amount of from 5 to 35 weight percent based on a total weight of the water retaining composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.
(2) Water:

Referring back to the water, the water may be any type and may be potable or non-potable, distilled or non-distilled, may be water suitable for farming, etc. The water may be present in the composition in any amount. In various embodiments, the water is present in an amount of from 5 to 60, 15 to 55, 15 to 35, 20 to 50, 25 to 45, 30 to 40, or 35 to 40, weight percent based on a total weight of the composition. In one embodiment, the water is present in an amount of from 5 to 60 weight percent based on a total weight of the water retaining composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.
(3) Surfactant:

The (3) surfactant can also be described as a surface wetting agent and is thought to affect the surface tension of the medium. For example, the surfactant may aid the alcohol alkoxylate adhere to the medium. Moreover, the surfactant may reduce the hydrophobicity of the medium so that water retention is increased. The surfactant is chosen from sulfosuccinates, alkyl sulfosuccinates, alcohol ethoxylates different from the (1) alcohol alkoxylate, block or reverse block copolymers of ethylene oxide and propylene oxide, alkylpolyglycosides and combinations thereof. It is contemplated that, in various embodiments, the medium and/or composition may alternatively be free of one or more sulfosuccinates, alkyl sulfosuccinates, alcohol ethoxylates different from the (1) alcohol alkoxylates, copolymers of ethylene oxide and propylene oxide, alkylpolyglycosides and combinations thereof, so long as the composition includes at least one of these. The terminology "free of" may be as described above.

Suitable non-limiting examples of sulfosuccinates include the free acid and its corresponding sodium, potassium, magnesium, calcium and ammonium salts, and combinations thereof. Suitable non-limiting examples of alkyl sulfosuccinates include salts of dioctyl sulfosuccinate, disodium laureth (3 or 2) sulfosuccinate, alkyl PEG sulfosuccinates, alkyldiphenyloxide disulfonate salts, and combinations thereof. In one embodiment, the surfactant is dioctyl sulfosuccinate. Suitable non-limiting examples of alcohol ethoxylates different from the (1) alcohol alkoxylate include linear and branched alcohol with an alkyl chain of from 3 to 18 carbons and a degree of ethoxylation from 2 to 40. Suitable non-limiting examples of alcohol ethoxylates are commercially available under the trade names Lutensol®

XP 30, Lutensol® XP 50, Lutensol® XP 70, Lutensol® XP 79, Lutensol® XP 80, Lutensol® XP 89, Lutensol® XP 90, Lutensol® XP 100, Lutensol® A65N, Lutensol® A9N, Lutensol® A12N, Lutensol® AT 25, Lutensol® TDA 6, Lutensol® TDA 9, Lutensol® TDA 10, Lutensol® TO 5, Lutensol® TO 12, Lutensol® TO 79, Lutensol® TO 8, Agnique® 9 OC 3, Agnique® 9 OC 5, NP 6, NP 9, NP 12, and combinations thereof. Suitable non-limiting examples of block or reverse block copolymers of ethylene oxide and propylene oxide are commercially available under the trade names Pluronic® L31, Pluronic® L35, Pluronic® L43, Pluronic® L61, Pluronic® L62, Pluronic® L64, Pluronic® P65, Pluronic® F68, Pluronic® F77, Pluronic® L81, Pluronic® P84, Pluronic® L92, Pluronic® F98, Pluronic® L101, Pluronic® P103, Pluronic® P104, Pluronic® P105, Pluronic® F108, Pluronic® L121, Pluronic® P123, Pluronic® F127, Pluronic® 10R5, Pluronic® 17R2, Pluronic® 17R4, Pluronic® 25R2, Pluronic® 25R4, Pluronic® 31R1, and combinations thereof. Suitable non-limiting examples of alkylpolyglycosides include an alkyl polyglycoside of a $C_8$-$C_{16}$ alcohol or combination of such alcohols. In other embodiments, the alkyl polyglycoside is further defined as an alkyl polyglycoside of a $C_{10}$-$C_{16}$ alcohol or combination of such alcohols. In further embodiments, the alkyl polyglycoside is further defined as an alkyl polyglycoside of a $C_8$-$C_{16}$ alcohol or combination of such alcohols. In various embodiments, the alkyl polyglycoside includes an alkyl polyglycoside of a $C_8$-$C_{10}$ alcohol, an alkyl polyglycoside of a $C_{12}$-$C_{14}$ alcohol, an alkyl polyglycoside of a $C_8$-$C_{16}$ alcohol, an alkyl polyglycoside of a $C_9$-$C_{11}$ alcohol, or combinations thereof.

In still other embodiments, the alkyl polyglycoside has the formula $R'OG_y$, wherein R' is a $C_6$ to $C_{18}$ linear or branched alkyl alcohol group, G is a glycoside, and y is an average degree of polymerization, wherein y is a number greater than 0 and up to 3. In this formula, R' is a $C_6$ to $C_{18}$ linear or branched alkyl alcohol group. However, R' may have any number or range of numbers from 8 to 18 relative to the number of carbon atoms. In various embodiments, R' is a $C_8$ to $C_{16}$, $C_8$ to $C_{14}$, $C_8$ to $C_{12}$, $C_8$ to $C_{10}$, $C_{10}$ to $C_{18}$, $C_{10}$ to $C_{16}$, $C_{10}$ to $C_{14}$, $C_{10}$ to $C_{12}$, $C_{12}$ to $C_{18}$, $C_{12}$ to $C_{16}$, $C_{12}$ to $C_{14}$, $C_{14}$ to $C_{18}$, $C_{14}$ to $C_{18}$, or $C_{16}$ to $C_{18}$, linear or branched alkyl group. Moreover, G is a glycoside. The glycoside may be a molecule wherein a sugar is bound to another functional group via a glycosidic bond. More specifically, the glycoside may be a sugar group that is bonded through its anomeric carbon to another group via a glycosidic bond. Glycosides can be linked by an O— (an O-glycoside), N— (a glycosylamine), S— (a thioglycoside), or C— (a C-glycoside) glycosidic bond. The glycoside may be alternatively described as a "glycosyl compound." In some embodiments, the sugar is bonded to a non-sugar thus excluding polysaccharides. In such embodiments, the sugar group can be described as a glycone and the non-sugar group as an aglycone. The glycone can be a single sugar group (a monosaccharide) or several sugar groups (an oligosaccharide). In one embodiment, the sugar or glycone group is, or is based on, glucose. Furthermore, y is an average degree of polymerization and is a number greater than 0 and up to 3 (i.e., $0<y \leq 3$), or any value or range of values therebetween. For example, in various embodiments, y is 1.1 to 2, 1.2 to 1.9, 1.3 to 1.8, from 1.4 to 1.7, from 1.5 to 1.6, from 1.2 to 1.7, etc. All values and ranges of values including and between the aforementioned values are hereby expressly contemplated in various non-limiting embodiments. Non-limiting examples of suitable alkyl polyglycosides are commercially available under the trade names Agnique® PG 264, Agnique® PG 8105, Agnique® PG 8107, Agnique® PG 9116, and Agnique® PG 8166, and combinations thereof.

The surfactant may be present in the composition in any amount. In various embodiments, the surfactant is present in an amount of from 20 to 65, 20 to 55 20 to 45, 20 to 40, 20 to 35, 20 to 25, 25 to 55, 25 to 45, 25 to 40, 30 to 35, 30 to 40, 30 to 45, or 40 to 45, weight percent based on a total weight of the composition. In one embodiment, the surfactant is present in an amount of from 1 to 50 weight percent based on a total weight percent of the water retaining composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

(4) Humectant:

The (4) humectant can also be described as an agent that helps the alcohol alkoxylate adhere to the medium. Moreover, the surfactant may increase water retention of the medium.

The humectant is chosen from propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin and triacetin, and combinations thereof. It is contemplated that, in various embodiments, the medium and/or composition may alternatively be free of one or more of propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin and triacetin, and combinations thereof, so long as the composition includes at least one of these. The terminology "free of" may be as described above.

Suitable non-limiting examples of polyethylene glycol include polyethylene glycol with a number average molecular weight of about 200 to about 4,500 Daltons. For example, the polyethylene glycol may have a number average weight of 200, 300, 400, 500, 600, 800, 1000, 1200, 1400, 1600, 1800, 2000, 2500, 3000, 3500, 4000, or 4500 Daltons, and combinations thereof. Non-limiting examples of polypropylene glycol include polypropylene glycol with a number average molecular weight of about 200 to about 4500 Daltons. For example, the polyethylene glycol may have a number average weight of 200, 300, 400, 500, 600, 800, 1000, 1200, 1400, 1600, 1800, 2000, 2500, 3000, 3500, 4000, or 4500 Daltons, and combinations thereof. In one embodiment, the humectant is propylene glycol and glycerol. In another embodiment, the humectant is propylene glycol. In a further embodiment, the humectant is glycerol.

The humectant may be present in the composition in any amount. In various embodiments, the humectant is present in an amount of from 5 to 15, 5 to 10, or 10 to 15, weight percent based on a total weight of the composition. In one embodiment, the humectant is present in an amount of from 1 to 20 weight percent based on a total weight of the water retaining composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

In an additional embodiment, the disclosure also provides treated peat moss that has increased water retention and includes or consists essentially of peat moss and the water retaining composition disposed on the peat moss and comprising, consisting essentially of, or consisting of, the alcohol alkoxylate, water, an alkyl sulfosuccinate, and a combination of propylene glycol and glycerol. In this embodiment, the water retaining composition is present in an amount of from 0.02 to 0.5 weight percent based on a total weight of the peat moss. Furthermore, the treated peat moss has a water retention of from 100 to 400 grams of water per 100 grams of treated peat moss as compared to a control peat moss that is free of the water retaining composition.

Method of Treating the Medium:

This disclosure also provides a method of treating the medium to increase water retention. The method includes the step of applying the composition to the medium to form the treated medium. The step of applying may be further defined as spraying, pouring, dipping, etc. In one embodiment, the method includes the steps of applying water to the treated medium, drying the treated medium to 30 wt % water based on the weight of the treated medium, and reapplying water after the step of drying such that the treated medium has a water retention of from 100 to 400, from 100 to 350, 125 to 325, 150 to 300, 175 to 275, 200 to 250, or 225 to 250, 275 to 300, 300 to 325 grams of water per 100 grams of treated medium as compared to a control medium that is free of the water retaining composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10%.

In the following, specific embodiments of the present invention are described:

1. A treated medium for plant growth comprising:
    A. a medium for plant growth; and
    B. a water retaining composition disposed on said medium comprising;
        (1) an alcohol alkoxylate having the structure:

$R\text{-}(EO)_m\text{—}(PO)_n\text{-}(EO)_y\text{—}(PO)_z\text{—}OH$ wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1,
        (2) water,
        (3) a surfactant selected from the group of sulfosuccinates, alkyl sulfosuccinates, alcohol ethoxylates different from said (1), copolymers of ethylene oxide and propylene oxide, alkylpolyglycosides and combinations thereof, and
        (4) a humectant selected from the group of propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin, triacetin, and combinations thereof.
2. The treated medium of embodiment 1 consisting of the medium (A) and the water retaining composition (B).
3. The treated medium of embodiment 1 or 2 wherein m is 0 to 5, n is 0 to 5, y is 10 to 20, z is 10 to 20 and (m+y) is at least 1.
4. The treated medium of embodiment 1 or 2 wherein m is 0 to 8, n is 2 to 8, y is 0 to 5, z is 0 to 5 and (m+y) is at least 1.
5. The treated medium of embodiment 1 or 2 wherein m is 10 to 20, n is 30-40, y is 0 to 5, z is 0 to 5 and (m+y) is at least 1.
6. The treated medium of any one of embodiments 1-6 having a water retention of from 100 to 400 grams of water per 100 grams of treated medium after wetting as compared to a control medium that is free of the water retaining composition (B).
7. The treated medium of any one of embodiments 1-6 wherein the alcohol alkoxylate (1) is present in an amount of from 5 to 35 weight percent based on the total weight of the water retaining composition (B).
8. The treated medium of any one of embodiments 1-7 wherein the alcohol alkoxylate (1) is present in an amount of from 20 to 35 weight percent based on the total weight of the water retaining composition (B).
9. The treated medium of any one of embodiments 1-8 wherein the surfactant (3) is dioctyl sulfosuccinate.
10. The treated medium of any one of embodiments 1-9 wherein the surfactant (3) is present in an amount of from 20 to 65 weight percent based on the total weight percent of the water retaining composition (B).
11. The treated medium of any one of embodiments 1-10 wherein the surfactant is present in an amount of from 20 to 55 weight percent based on the total weight percent of the water retaining composition (B).
12. The treated medium of any one of embodiments 1-11 wherein the humectant (4) is propylene glycol.
13. The treated medium of any one of embodiments 1-11 wherein the humectant (4) is glycerol.
14. The treated medium of any one of embodiments 1-11 wherein the humectant (4) is a combination of propylene glycol and glycerol.
15. The treated medium of any one of embodiments 1-14 wherein said humectant (4) is present in an amount of from 1 to 20 weight percent based on the total weight of the water retaining composition (B).
16. The treated medium of any one of embodiments 1-14 wherein the humectant (4) is present in an amount of from 5 to 15 weight percent based on the total weight of the water retaining composition (B).
17. The treated medium of any one of embodiments 1-16 wherein said water is present in an amount of from 5 to 60 weight percent based on the total weight of the water retaining composition (B).
18. The treated medium of any one of embodiments 1-16 wherein said water is present in an amount of from 15 to 35 weight percent based on the total weight of the water retaining composition (B).
19. The treated medium of any one of embodiments 1-18 wherein the water retaining composition (B) consists of the alcohol alkoxylate (1), water, the surfactant (3), and the humectant (4).
20. The treated medium of any one of embodiments 19 wherein the water retaining composition (B) is present in an amount of from 0.02 to 0.5 weight percent based on the total weight of the treated medium.
21. The medium (A) of any one of embodiments 1-20 wherein the medium (A) is selected from the group of soil comprising minerals, gas, loam, clay, silt, sand, organic peat, organic matter, humus, potted soil and mixtures thereof.
22. A method of treating a medium (A) for plant growth to increase water retention, the method comprising the step of applying the water retaining composition (B) as defined in any one of embodiments 1-21 to the medium (A) to form the treated medium.
23. The method according to embodiment 22, wherein the treated medium has a water retention of from 100 to 400 grams of water per 100 grams treated medium compared to a control medium that is free of the water retaining composition.

24. The method of embodiment 22 further comprising the steps of:

applying water to the treated medium;

drying the treated medium to at least 30 wt % water based on the weight of the treated medium; and reapplying water to the treated medium after the step of drying.

25. Treated peat moss comprising:
   A. peat moss; and
   B. a water retaining composition disposed on said peat moss comprising;
      (1) an alcohol alkoxylate having the structure:

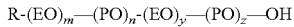

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1,
      (2) water,
      (3) an alkyl sulfosuccinate, and
      (4) a combination of propylene glycol and glycerol, wherein said water retaining composition is present in an amount of from 0.02 to 0.5 weight percent based on the total weight of said peat moss.

26. The treated peat moss according to embodiment 25, wherein the treated peat moss has a water retention of from 100 to 400 grams of water per 100 grams of treated peat moss as compared to a control peat moss that is free of the water retaining composition.

Examples

A series of water retaining compositions (Comp. 1-11) and treated mediums for plant growth (Treated Mediums 1-11) are prepared as set forth below. The Treated Mediums 1-11 are treated with Comp. 1-11, respectively. 100% water is also used to prepare a untreated medium.

Peat moss is dried to a moisture content of <10% in a conventional laboratory oven set at 30-45° C. or higher. The moisture content of the peat moss is determined with a moisture balance (Sartorius MSA 150 or equivalent moisture balance) using approximately 2 g of dried peat moss. Six hundred grams of the dried peat moss is added to a Kitchen Aid® mixer running at the lowest speed. For compositions 1-8, 40 grams of water retaining compositions 1-8, respectively, are sprayed onto the peat moss using a spray bottle in fewer than two minutes while the peat moss is mixing. After all of the water retaining composition is applied to the peat moss, the peat moss is allowed to mix for an additional two minutes before stopping to scrape down the sides and remove moist peat clinging to the sides of the mixing bowl. The mixture is then stirred for one additional minute at the prior speed to obtain a uniform mixture.

The treated peat moss is distributed equally among 12 containers, such as flower pots with 4" diameter and 3" depth. Each pot is placed above a 500 mL pre-tared beaker such that all run-off will be captured in the beaker. Three hundred grams of water is slowly added to each pot such that the water level is consistently above the peat. Once all water has stopped dripping, approximately 30 seconds after the last drop, the 500 mL beaker is weighed. The water retention is calculated by the difference between the 300 g of added water and the mass of the collected water and is expressed as the ratio of the mass of water retained on the peat moss over the mass of the peat moss. The water retention is expressed as g water/g peat moss.

The treated composition can be tested for a persistent wetting effect subsequent to the addition of the water retaining composition. After the first wetting, the peat moss is removed from the pots, evenly spread onto a tray, and allowed to dry at room temperature until the moisture content is about 30% as determined by a Sartorius MSA 150 (or equivalent) moisture balance. The treated peat moss is distributed between containers, typically flower pots with a 4" diameter and a 3" depth, such that each of compositions 1-8 contains 50 g of the treated composition and each of the compositions 9-11 contains 75 g of the treated composition. Each pot is placed above a 500 mL pre-tared beaker such that all run-off will be captured in the beaker. Three hundred grams of water is slowly added to each pot such that the water level is consistently above the peat. Once all water has stopped dripping, approximately 30 seconds after lost drop, the 500 mL beaker is weighed. The water retention is calculated by the difference between the 300 g of added water and the mass of the collected water and is expressed as the ratio of the mass of water retained on the peat moss over the mass of the peat moss. The water retention is expressed as g water/g peat moss and is referred to as Second Pass Water Retention. This process can be repeated iteratively to determine the respective Third Pass Water Retention, Fourth Pass Water Retention, etc. The data associated with these evaluations is set forth in Table 1 and Table 2 below.

TABLE 1

|  | Water % | Comp. 1 % | Comp. 2 % | Comp. 3 % | Comp. 4 % |
|---|---|---|---|---|---|
| Water | 100 | 24 | 24 | 24 | 24 |
| Surfactant 1 |  | 38 | 38 | 38 | 38 |
| Surfactant 2 |  |  |  |  | 26 |
| Surfactant 3 |  |  |  |  |  |
| Humectant |  | 12 | 12 | 12 | 12 |
| Alcohol Alkoxylate 1 |  | 26 |  |  |  |
| Alcohol Alkoxylate 2 |  |  | 26 |  |  |
| Alcohol Alkoxylate 3 |  |  |  | 26 |  |
| Alcohol Alkoxylate 4 |  |  |  |  |  |
| Alcohol Alkoxylate 5 |  |  |  |  |  |

TABLE 1-continued

|  | Comp. 5 % | Comp. 6 % | Comp. 7 % | Comp. 8 % |
|---|---|---|---|---|
| Water | 24 | 24 | 24 | 24 |
| Surfactant 1 | 38 | 38 | 38 | 38 |
| Surfactant 2 |  |  |  |  |
| Surfactant 3 |  |  | 6.5 | 13 |
| Humectant | 12 | 12 | 12 | 12 |
| Alcohol Alkoxylate 1 |  |  |  |  |
| Alcohol Alkoxylate 2 |  |  |  | 13 |
| Alcohol Alkoxylate 3 |  |  | 19.5 |  |
| Alcohol Alkoxylate 4 | 26 |  |  |  |
| Alcohol Alkoxylate 5 |  | 26 |  |  |

|  | Untreated Medium | Treated Medium 1 | Treated Medium 2 | Treated Medium 3 | Treated Medium 4 |
|---|---|---|---|---|---|
| Water Retention (g water/g peat) | grams | grams | grams | grams | grams |
| Initial Water Retention | 0.18 | 2.68 | 2.88 | 2.92 | 2.32 |
| Second Pass Water Retention | 0.18 | 1.36 | 1.18 | 1.08 | 1.26 |
| Third Pass Water Retention | 0.18 | 1.3 | 1.38 | 1.06 | 1.5 |
| Retention Increase (%) | % | % | % | % | % |
| Initial Water Retention | — | 1389 | 1500 | 1522 | 1189 |
| Second Pass Water Retention | — | 656 | 556 | 500 | 600 |
| Third Pass Water Retention | — | 622 | 667 | 489 | 733 |

|  | Treated Medium 5 | Treated Medium 6 | Treated Medium 7 | Treated Medium 8 |
|---|---|---|---|---|
| Water Retention (g water/g peat) | grams | grams | grams | grams |
| Initial Water Retention | 2.24 | 2.22 | 2.56 | 2.48 |
| Second Pass Water Retention | 0.74 | 0.56 | 2.34 | 2.8 |
| Third Pass Water Retention | 0.52 | 0.60 | 1.92 | 2.34 |
| Retention Increase (%) | % | % | % | % |
| Initial Water Retention | 1144 | 133 | 1322 | 1278 |
| Second Pass Water Retention | 311 | 211 | 1200 | 1456 |
| Third Pass Water Retention | 189 | 278 | 967 | 1200 |

TABLE 2

|  | Comp. 9 % | Comp. 10 % | Comp. 11 % |
|---|---|---|---|
| Water | 7 | 6.7 | 7 |
| Surfactant 1 | 52.5 | 50 | 52.5 |
| Humectant | 10.5 | 10 | 10.5 |
| Alcohol Alkoxylate 1 |  |  | 30 |
| Alcohol Alkoxylate 2 |  | 33.3 |  |
| EO/PO Block Copolymer | 30 |  |  |

|  | Treated Medium 9 | Treated Medium 10 | Treated Medium 11 |
|---|---|---|---|
| Water Retention (g water/g peat) | grams | grams | grams |
| Initial Water Retention | 2.60 | 2.64 | 2.33 |
| Second Pass Water Retention | 1.79 | 1.76 | 2.27 |
| Third Pass Water Retention | 1.80 | 2.31 | 2.13 |
| Retention Increase (%) | % | % | % |
| Initial Water Retention | 1344 | 1367 | 1194 |
| Second Pass Water Retention | 894 | 878 | 1161 |
| Third Pass Water Retention | 900 | 1183 | 1083 |

Surfactant 1 is di-octyl sulfosuccinate. Surfactant 2 is a branched C10 alcohol with an average of 8 EO units. Surfactant 3 is Pluronic L62, an EO PO block copolymer. The humectant is propylene glycol.

The Alcohol Alkoxylates have the formula:

$$R\text{-}(EO)_m\text{-}(PO)_n\text{-}(EO)_y\text{-}(PO)_z\text{-}OH$$

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1.

Alcohol Alkoxylate 1 has the aforementioned formula wherein R is a branched C10 Guerbet alcohol, m is 0-5, y is 10-20, n is 1-5, z is 10-20, and (m+y) is 10-25.

Alcohol Alkoxylate 2 has the aforementioned formula wherein R is a branched C10 Guerbet alcohol, m is 0-8, y is 0-5, n is 2-8, z is 0-5, and (m+y) is 1-13.

Alcohol Alkoxylate 3 has the aforementioned formula wherein R is C4, m is 10-20, y is 0-5, n is 30-40, z is 0-5, and (m+y) is 10-25.

Alcohol Alkoxylate 4 has the aforementioned formula wherein R is a branched C10 Guerbet alcohol, m is 0-8, y is 0-5, n is 2-8, z is 0-5, and (m+y) is 1-13.

Alcohol Alkoxylate 5 has the aforementioned formula wherein R is C13-C15 linear and branched, m is 0-8, y is 0-5, n is 2-8, z is 0-5, and (m+y) is 1-13.

The data shows that the peat treated with the various Comp. 1-11 retain more water than untreated peat after the initial treatment with water. Furthermore, the peat treated with various Comp. 1-11 retain more water than untreated peat after rewetting the peat for two additional times than untreated peat. The peat treated with Comp 7-8 further demonstrate a significant enhanced retention of water than the untreated peat or peat treated with Comp 1-6 after rewetting the peat for two additional times.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure. In various non-limiting embodiments, all values and ranges of values between and including the aforementioned values are hereby expressly contemplated.

One or more of the values described above may vary by ±5%, ±10%, ±15%, ±20%, ±25%, etc. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A treated medium for plant growth comprising:
   A. a medium for plant growth; and
   B. a water retaining composition disposed on the medium (A) comprising;
   (1) an alcohol alkoxylate having the structure:

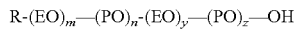

R-(EO)$_m$—(PO)$_n$-(EO)$_y$—(PO)$_z$—OH wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1, wherein the alcohol alkoxylate is present in an amount of from 5 to 35 weight percent based on the total weight of the water retaining composition (B),
   (2) water,
   (3) a surfactant selected from the group of sulfosuccinates, alkyl sulfosuccinates, alcohol ethoxylates different from the alcohol alkoxylate (1), copolymers of ethylene oxide and propylene oxide, alkylpolyglycosides and combinations thereof, and
   (4) a humectant selected from the group of propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin, triacetin, and combinations thereof, wherein the humectant is present in an amount of from 1 to 20 weight percent based on the total weight of the water retaining composition (B).

2. The treated medium of claim 1 consisting of the medium (A) and the water retaining composition (B).

3. The treated medium of claim 1 wherein m is 0 to 5, n is 1 to 5, y is 10 to 20, z is 10 to 20 and (m+y) is at least 1.

4. The treated medium of claim 1 wherein m is 0 to 8, n is 2 to 8, y is 0 to 5, z is 0 to 5 and (m+y) is at least 1.

5. The treated medium of claim 1 wherein m is 10 to 20, n is 30-40, y is 0 to 5, z is 0 to 5 and (m+y) is at least 1.

6. The treated medium of claim 1 having a water retention of from 100 to 400 grams of water per 100 grams of treated medium after wetting as compared to a control medium that is free of the water retaining composition.

7. The treated medium of claim 1 wherein the alcohol alkoxylate (1) is present in an amount of from 20 to 35 weight percent based on the total weight of the water retaining composition (B).

8. The treated medium of claim 1 wherein the surfactant (3) is dioctyl sulfosuccinate.

9. The treated medium of claim 1 wherein the surfactant (3) is present in an amount of from 20 to 65 weight percent based on the total weight percent of the water retaining composition (B).

10. The treated medium of claim 1 wherein the surfactant (3) is present in an amount of from 20 to 55 weight percent based on the total weight percent of the water retaining composition (B).

11. The treated medium of claim 1 wherein the humectant (4) is propylene glycol, glycerol and mixtures thereof.

12. The treated medium of claim 1 wherein the humectant (4) is present in an amount of from 5 to 15 weight percent based on the total weight of the water retaining composition (B).

13. The treated medium of claim 1 wherein water is present in an amount of from 5 to 60 weight percent based on the total weight of the water retaining composition (B).

14. The treated medium of claim 1 wherein water is present in an amount of from 15 to 35 weight percent based on the total weight of the water retaining composition (B).

15. The treated medium of claim 1 wherein the water retaining composition (B) consists of the alcohol alkoxylate (1), water, the surfactant (3), and the humectant (4).

16. The treated medium of claim 1 wherein the water retaining composition is present in an amount of from 0.02 to 0.5 weight percent based on the total weight of the treated medium.

17. The treated medium of claim 1 wherein the medium (A) is a soil comprising at least one component selected from the group consisting of minerals, gas, loam, clay, silt, sand, organic peat, organic matter, humus, potted soil and mixtures thereof.

18. A method of treating a medium (A) for plant growth to increase water retention, the method comprising the step of applying a water retaining composition (B) comprising:
(1) an alcohol alkoxylate having the structure:

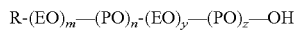

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1, wherein the alcohol alkoxylate is present in an amount of from 5 to 35 weight percent based on the total weight of the water retaining composition (B),
(2) water,
(3) a surfactant selected from the group of sulfosuccinates, alkyl sulfosuccinates, alcohol ethoxylates different from the alcohol alkoxylate (1), copolymers of ethylene oxide and propylene oxide, alkylpolyglycosides and combinations thereof, and
(4) a humectant selected from the group of propylene glycol, butylene glycol, pentylene glycol, hexylene glycol, triethylene glycol, tripropylene glycol, polyethylene glycol, polypropylene glycol, glycerol, sorbitol, xylitol, mannitol, lactic acid, diacetin, triacetin, and combinations thereof, wherein the humectant is present in an amount of from 1 to 20 weight percent based on the total weight of the water retaining composition (B),
to the medium (A) to form the treated medium.

19. The method according to claim 18, wherein the treated medium has a water retention of from 100 to 400 grams of water per 100 grams treated medium compared to a control medium that is free of the water retaining composition.

20. The method of claim 18 further comprising the steps of:
applying water to the treated medium;
drying the treated medium to at least 30 wt % water based on the weight of the treated medium; and
reapplying water to the treated medium after the step of drying.

21. Treated peat moss that has increased water retention comprising:
A. peat moss; and
B. a water retaining composition disposed on the peat moss comprising;
(1) an alcohol alkoxylate having the structure:

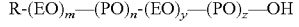

wherein R is a $C_3$-$C_{17}$ linear or branched aliphatic carbon chain, EO is ethylene oxide, m is from 0 to 20, y is from 0 to 20, PO is propylene oxide, n is from 1 to 40, z is from 0 to 40, and (m+y) is at least 1, wherein the alcohol alkoxylate is present in an amount of from 5 to 35 weight percent based on the total weight of the water retaining composition (B),
(2) water,
(3) an alkyl sulfosuccinate, and
(4) a combination of propylene glycol and glycerol present in an amount of from 1 to 20 weight percent based on the total weight of the water retaining composition (B),
wherein the water retaining composition is present in an amount of from 0.02 to 0.5 weight percent based on a total weight of the peat moss.

* * * * *